United States Patent
Marek et al.

(10) Patent No.: US 7,394,349 B2
(45) Date of Patent: Jul. 1, 2008

(54) DEVICE AND METHOD TO DETECT PRESENCE IN A MOTOR VEHICLE

(75) Inventors: Jiri Marek, Reutlingen (DE); Horst Muenzel, Reutlingen (DE); Michael Arndt, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 11/111,197

(22) Filed: Apr. 20, 2005

(65) Prior Publication Data
US 2005/0280515 A1    Dec. 22, 2005

(30) Foreign Application Priority Data
Jun. 19, 2004   (DE)   ............ 10 2004 029 837

(51) Int. Cl.
*B60Q 1/00* (2006.01)
*H04Q 7/00* (2006.01)
*G01N 7/00* (2006.01)

(52) U.S. Cl. .............. 340/425.5; 340/426.18; 340/539.26; 340/539.1; 180/271; 307/10.1

(58) Field of Classification Search .............. 340/425.5, 340/426.2, 426.25, 426.26
See application file for complete search history.

(56) References Cited

U.S. PATENT DOCUMENTS 6,424,267 B1 * 7/2002 Schell ................ 340/632
6,768,420 B2 * 7/2004 McCarthy et al. ......... 340/573.1
7,109,853 B1 * 9/2006 Mattson et al. .......... 340/426.29

FOREIGN PATENT DOCUMENTS

| DE | 3740770 | 6/1989 |
|---|---|---|
| DE | 196 29 940 | 1/1998 |
| DE | 10020508 | 11/2000 |

* cited by examiner

*Primary Examiner*—Donnie L Crosland
(74) *Attorney, Agent, or Firm*—Kenyon & Kenyon LLP

(57) ABSTRACT

A device to detect the presence of a living being in a motor vehicle includes a carbon dioxide sensor to measure a concentration value representing the carbon dioxide concentration in the motor vehicle, an analysis unit to compare the concentration value or a change value representing the change in the concentration value over time to a threshold, a transmitting device activated when the concentration value or the change value exceeds the threshold and emitting radiated signals by way of an antenna and a receiving device that activates an indicator device when these radiated signals are received by way of an additional antenna.

10 Claims, 2 Drawing Sheets

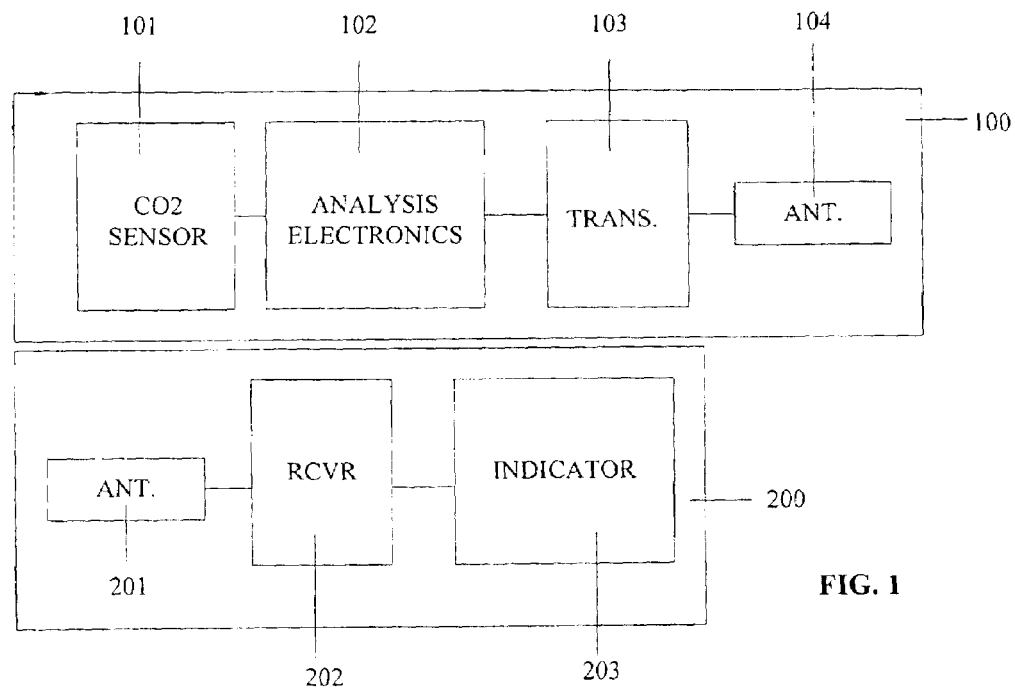
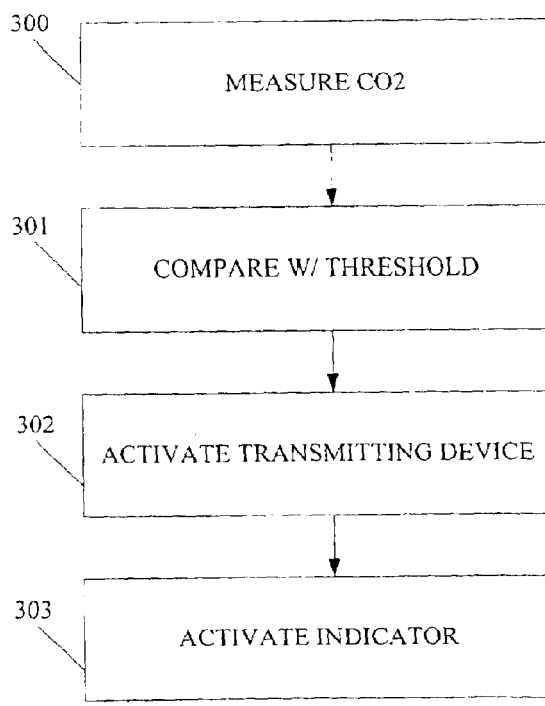
FIG. 1
FIG. 2

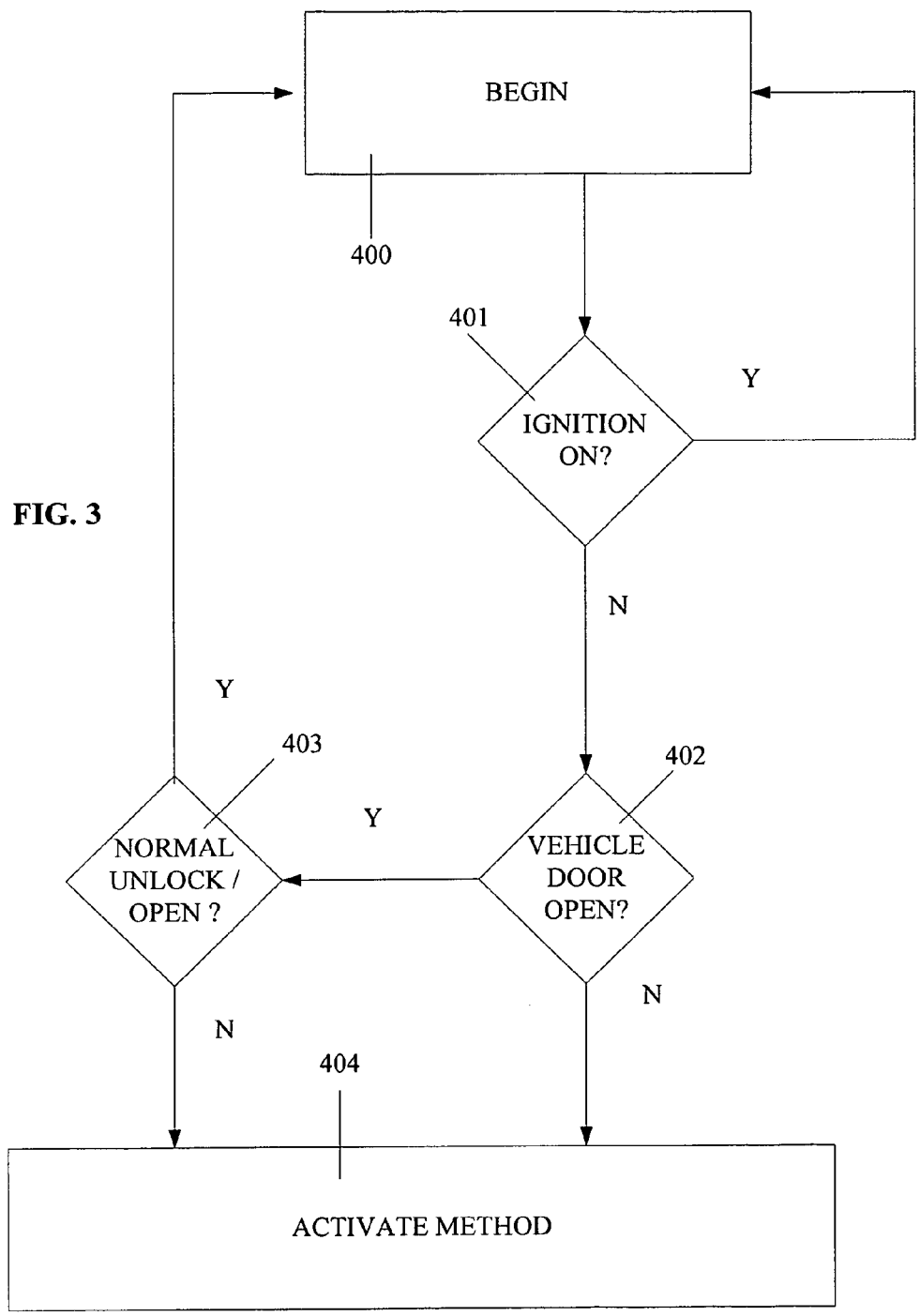

DEVICE AND METHOD TO DETECT PRESENCE IN A MOTOR VEHICLE

FIELD OF THE INVENTION

The present invention relates to a device for detecting the presence of a living being in a motor vehicle.

BACKGROUND INFORMATION

A device for the forced-air ventilation of inhabitable recreational vehicles is described in German Patent Application No. DE 196 29 940, this device providing forced-air ventilation of the motor vehicle depending on the carbon dioxide content of the inside air.

SUMMARY OF THE INVENTION

The present invention relates to a system or a device for detecting the presence of a living being (in particular, a person) in a motor vehicle, including
- a carbon dioxide sensor for measuring a concentration value representing the carbon dioxide concentration in the motor vehicle,
- an analysis unit to compare the concentration value or a change value representing the change in the concentration value over time to one or at least one threshold,
- a transmitting device which is activated when the concentration value or the change value exceeds the threshold and which emits radiated signals, in particular via an antenna, and
- a receiving device that activates an indicator device when these radiated signals are received, in particular by way of an additional antenna.

In this way, it is possible to determine from outside the vehicle whether there are persons or living beings inside the vehicle.

One advantageous embodiment of the present invention is characterized in that the transmitting device is designed as a radio transmitter and that the receiving device is designed as a radio receiver. In this manner, wireless communication is possible even over long distances.

There is an advantageous embodiment of the present invention wherein the radio receiver and the indicator device are attached to the vehicle key. As the driver of the vehicle requires the vehicle key before opening the vehicle, the information for the driver is certain to be available in good time.

In another advantageous embodiment, the transmitting device together with the transmission antenna is permanently mounted on or integrated into the vehicle. The receiving device together with the reception antenna is mounted external to or away from the vehicle.

One advantageous embodiment of the present invention is characterized in that the indicator device emits a visual and/or acoustical and/or haptic warning signal to the driver or to the person carrying the receiving device.

One advantageous embodiment of the present invention is characterized in that a warning signal is additionally emitted by way of the lighting system and/or the horn of the vehicle.

There is an advantageous embodiment of the present invention wherein the transmitting device is designed as a cellular telephone transmitter and the receiving device is designed as a cellular telephone. In this way, the infrastructure of the cellular telephone network that already exists over a broad area can be used.

An advantageous embodiment of the present invention is characterized in that the carbon dioxide sensor measures the concentration value prevailing in the passenger compartment of the vehicle.

The present invention further relates to a method for detecting the presence of a living being in a motor vehicle in which
- a concentration value representing the carbon dioxide concentration in the motor vehicle is measured and
- the concentration value or a change value representing the change in the concentration value over time is compared to a threshold.

Furthermore,
- when the concentration value or the change value exceeds the threshold, a transmitting device is activated that emits radiated signals via an antenna and
- a receiving device activates an indicator device when these radiated signals are received by way of another antenna.

One advantageous embodiment of the present invention is characterized in that the transmitting device is activated only if
- all vehicle doors are detected as locked and/or
- all vehicle doors were detected as locked and subsequently at least one vehicle door is detected as being opened not using the vehicle key or as not being properly opened.

There is one advantageous embodiment of the present invention wherein the transmitting device is only activated if the ignition system is also switched off.

Of course, the advantageous embodiments of the device of the present invention also manifest themselves as advantageous embodiments of the method of the present invention and vice versa.

BRIEF DESCRIPTION OF THE DRAWINGS

FIG. 1 illustrates the structure of the device of the present invention.

FIG. 2 depicts the basic sequence of the method of the present invention.

FIG. 3 illustrates the sequence of one embodiment of the method of the present invention.

DETAILED DESCRIPTION

Using the present invention, it is possible to detect unwelcome persons in a vehicle (car, truck, recreational vehicle, . . . ) and to warn the driver before entry.

To this end, a carbon dioxide sensor is connected to analysis electronics. The carbon dioxide sensor supplies an output signal representing the carbon dioxide concentration of the air in the vehicle interior. In particular, this involves a signal proportional to the carbon dioxide content. The analysis electronics compares this output signal to a threshold. As an alternative or in addition to this, the slope (i.e., the change per unit time) of this output signal may be compared to a threshold. If the output signal or its slope exceeds an absolute threshold, a signal is triggered that activates a transmitter. This transmitter then transmits a warning signal to a suitable receiver, which then generates a warning signal, this receiver preferably being in the possession of the owner or driver of the vehicle.

Infrared optical sensors or chemical sensors (metal oxide sensors, electrochemical sensors, GasFETs such as HSGFET or MAIS . . . ) may be used as carbon dioxide sensors. In addition to carbon dioxide sensors, the system can be equipped with other sensors for toxic or flammable gases (e.g., CO, NOx, HC, . . . ) that detect a hazard to the occupants.

A microcontroller may be used to monitor the absolute value of the carbon dioxide concentration or its rate of increase.

The transmitter may be designed, for example, as a radio transmitter or as a cellular telephone transmitter, so that the warning signal may be transmitted

- either to a radio receiver, for example, on the vehicle key of the driver or
- to the cellular telephone of the driver, for example, as a short text message.

The driver may then be warned, for example, by way of a visual, acoustical or haptic indicator. In the case of the haptic indicator, vibration may be used, for example.

When using a radio remote control to open the vehicle, a warning can be given by way of the lighting system or the horn of the vehicle as an alternative or additionally. The warning is given, for example, in that moment when the radio remote control is actuated, or immediately thereafter, and an excessive carbon dioxide concentration was measured previously.

The system of the present invention can detect both sudden attack situations where, for example, a person is hiding in the vehicle and waiting for the driver, as well as animals or children inadvertently forgotten in the vehicle. The driver is alerted to these situations by a warning.

The structure of an exemplary embodiment of the system of the present invention is illustrated in FIG. 1. This system includes two subsystems:

Block 100 marks the subsystem located in the vehicle and
Block 200 marks the subsystem preferably in the possession of the driver or the vehicle owner.

Block 100 includes a carbon dioxide sensor 101, the output signals of this sensor being transmitted to analysis electronics 102. In block 102, the output signal of the carbon dioxide sensor is monitored to determine whether it exceeds a threshold. Instead of the output signal, its slope (i.e., change per unit time) may also be compared to a threshold. In this way, a transmitter 103 that radiates signals by way of an antenna 104 is activated if a person is detected in the vehicle interior.

Block 200, located with the driver, has an antenna 201 for receiving the signals radiated by antenna 104. Antenna 201 activates a receiver 202 that, if applicable, emits a warning to the driver by way of indicator 203.

The sequence of the method of the present invention is illustrated in FIG. 2.

In this context, a concentration value representing the carbon dioxide concentration in the motor vehicle is measured in block 300. Then, the concentration value or a change value representing the change in the concentration value over time is compared to a threshold in block 301. Next, a transmitting device that emits radiated signals by way of an antenna is activated in block 302 if the concentration value or the change value exceeds the threshold. Then, in block 303, an indicator device is activated by a receiving device when these radiated signals are received by way of another antenna.

One embodiment of the method of the present invention is shown in FIG. 3. Following the start of the method in block 400 it is queried in block 401, whether the ignition system is switched on. If the answer is "yes" (marked in FIG. 3 with "y"), the sequence returns to block 400. If the answer is "no" (i.e., the ignition system is switched off, marked in FIG. 3 with "n"), it is queried in block 402 whether at least one vehicle door is open or unlocked. If the answer is "no," the method shown in FIG. 2 is activated in block 404, i.e., the carbon dioxide concentration is determined, compared to a limiting value and, if applicable, a warning is emitted to the driver. As an alternative, only the transmitting device may be activated in block 404, i.e., the carbon dioxide concentration is determined continuously but the transmitting device is activated only if all doors are locked or were opened in a manner that is not normal.

If the answer to the query in block 402 is "yes" (i.e., at least one door is open or unlocked, marked with "y"), then it is queried in block 403 whether the door was opened or unlocked properly or normally. If this answer is "yes" (i.e., the door was unlocked properly), then a branch is made back to block 400. If the answer is "no," the sequence continues to block 404.

What is claimed is:

1. A device to detect the presence of a living being in a motor vehicle, comprising:
    a carbon dioxide sensor to measure a concentration value representing a carbon dioxide concentration in the motor vehicle;
    an analysis unit to compare at least one of the concentration value and a change value representing a change in the concentration value over time with at least one threshold;
    a transmitting device activated when at least one of the concentration value and the change value exceeds the threshold and emitting radiated signals; and
    a receiving device to activate an indicator device when the radiated signals are received, wherein the receiving device and the indicator device are attached to a vehicle key, and wherein the indicator device issues at least one of a visual and haptic warning signal upon activation.

2. The device according to claim 1, wherein the transmitting device includes a radio transmitter and the receiving device includes a radio receiver.

3. The device according to claim 1, wherein the transmitting device includes a cellular telephone transmitter and the receiving device includes a cellular telephone.

4. The device according to claim 1, wherein the carbon dioxide sensor measures the concentration value prevailing in a passenger compartment of the vehicle.

5. The device according to claim 1, wherein the transmitting device is permanently mounted on the vehicle and the receiving device is mounted external to the vehicle.

6. The device according to claim 1, wherein the transmitting device emits radiated signals by way of an antenna and the receiving device receives the radiated signals by way of another antenna.

7. A method to detect the presence of a living being in a motor vehicle, the method comprising:
    measuring a concentration value representing a carbon dioxide concentration in the motor vehicle;
    comparing at least one of the concentration value and a change value representing a change in the concentration value over time to a threshold;
    activating a transmitting device for emitting radiated signals via an antenna when at least one of the concentration value and the change value exceeds the threshold; and
    activating an indicator device by a receiving device when the radiated signals are received by way of another antenna, wherein the receiving device and the indicator device are attached to a vehicle key, and wherein the indicator device issues at least one of a visual and haptic warning signal upon activation.

8. The method according to claim 7, wherein the transmitting device is activated only if at least one of (a) all vehicle doors are detected as locked and (b) all vehicle doors are detected as locked and then at least one vehicle door is detected as opened not using a vehicle key.

9. The method according to claim 8, wherein the transmitting device is activated only if an ignition system is also switched off.

10. The method according to claim 7, wherein, in addition, a warning signal is emitted by way of at least one of a lighting system and a horn of the vehicle.

* * * * *